United States Patent

Whitehouse

[11] 4,084,324
[45] Apr. 18, 1978

[54] MEASURING INSTRUMENT

[75] Inventor: David John Whitehouse, Melton Mowbray, England

[73] Assignee: The Rank Organisation Limited, London, England

[21] Appl. No.: 679,819

[22] Filed: Apr. 23, 1976

[30] Foreign Application Priority Data

Apr. 23, 1975 United Kingdom ............... 16813/75
Jan. 7, 1976 United Kingdom ............... 00475/76

[51] Int. Cl.$^2$ .............................. G01B 7/34; G01B 7/28
[52] U.S. Cl. .................................. 33/174 L; 33/174 L; 33/178 E; 73/105
[58] Field of Search ........... 33/174 L, 174 P, 174 PA, 33/178 D, 178 E; 73/105

[56] References Cited

U.S. PATENT DOCUMENTS

| 3,056,209 | 10/1962 | Oliver | 33/174 L |
| 3,470,739 | 10/1969 | Takafuji et al. | 33/174 P |
| 3,557,613 | 1/1971 | Perthen et al. | 73/105 |
| 3,573,444 | 4/1971 | Kawabata et al. | 33/174 L |
| 3,720,818 | 3/1973 | Spragg et al. | 73/105 |

FOREIGN PATENT DOCUMENTS 1,423,752 10/1969 Germany ........................... 33/174 L Primary Examiner—Houston S. Bell
Assistant Examiner—Richard R. Stearns
Attorney, Agent, or Firm—Brisebois & Kruger

[57] ABSTRACT

A surface measurement apparatus of the type in which a sensor is traversed along a path in contact with or adjacent the surface of a component under test. The sensor has three or more transducers which, in the described embodiment, physically contact the surface under test and produce individual signals as they are traversed along the same path over the surface of the component under test. The signals produced by the transducers are amplified and combined in such a way that the composite signal so produced is not dependent on any variation in the position of the body of the transducers as the device is traversed along the surface of the component under test thereby allowing the use of sensors which are not mounted on accurately preformed datum-determining mounts such as a flat bed or an accurate spindle.

31 Claims, 14 Drawing Figures

MEASURING INSTRUMENT

The present invention relates to surface measurement apparatus.

Surface measurement apparatus is constructed for measuring surface parameters to a high degree of accuracy. In order to achieve the required degree of accuracy it is necessary for the apparatus to be accurately manufactured and correctly used. In one known type of apparatus a sensor head is drawn along a path in contact with the surface under test and the signal from the sensor is analysed to derive the required information. The sensor signals are derived from movement of the sensor in a direction transverse the plane of the surface under test and the line of the traverse, and these movements are detected with reference to a datum provided by the mounting on which the sensor is carried.

For example, for the purpose of assessing a nominally flat surface it is necessary for the sensor to be moved along a flat reference surface, the probe of the sensor being in contact with the surface under test, and movements of the probe with reference to the surface are used to derive the sensor signals indicative of the surface roughness, waviness, error of form or other textural information which is required. Similarly, in the measurement of round components it is necessary to relatively rotate a sensor and a workpiece or other component under test and the accuracy of the spindle about which the relative rotation takes place is critical to the performance of the apparatus. Usually, for circular components it is necessary initially to set up the component under test on a rotary table of the apparatus, which table is accurately constructed so that the relative rotation of the table and the workpiece takes place about a common centre. Adjustments to the position of the workpiece are then made to locate the position where the centre of the workpiece is considered to lie in coincidence with the centre of relative rotation of the table and the transducer, or alternatively, to derive signals representing the eccentricity of the table and the workpiece so that subsequently derived signals from the transducer can be corrected for this eccentricity.

The requirement for such a reference datum, whether linear or circular, places a limitation on the size of the workpiece which can be handled by the apparatus, and also involves long setting-up operations to ensure that there is no error in the position of the reference with respect to that of the workpiece. It is not possible, with such apparatus, to determine, for example, the roundness of a workpiece to the degree of accuracy usually required, while it is being manufactured, that is while it is still in position on a lathe or other machine tool. This means that if the component is to be assessed during manufacture it must be removed from its position on the machine on which it is being made, located on the surface measurement apparatus, measured and subsequently returned to the manufacturing machine. Such a process involves unacceptable inaccuracies in repositioning the component on the machine tool. For this reason investigations have been made to seek means able to measure the roundness of a component being manufactured without it being necessary to remove it from the machine tool on which it is being made. The bearings of machine tools such as lathes and the like, however, are not sufficiently accurate to permit their use in defining a reference datum since they would introduce irregular errors which could not be compensated in known apparatus.

The present invention seeks, therefore, to provide surface measurement apparatus in which the provision of a separate datum reference is not required. Thus, for example, the accurately mounted spindle of a rotary surface measurement instrument, or the flat bed of a linear surface measurement instrument are not necessary in embodiments of this invention.

This is achieved, according to one aspect of the present invention, by surface measurement apparatus of the type in which a sensor is traversed along a path in contact with or adjacent the surface of a component under test, in which the sensor comprises a plurality of transducers, each individually sensitive to surface variations and mounted, spaced from one another by a predetermined distance or predetermined distances on a common support such that each traverses substantially the same path upon relative movement of the support and the component under test, the separation of the support from the surface of the component under test providing an instantaneous reference datum for the transducers in generating the output signals thereof, and there being means for combining the output signals from the transducers to produce a composite signal which includes no component due to imperfections in the reference datum.

In such surface measurement apparatus, since the composite output signal therefrom includes no components due to imperfections in the reference datum, it is not necessary to provide an accurate datum as has previously been required in known surface measurement apparatus. It will be appreciated that some form of reference datum against which the movement of the transducers (if of the contact type) can be referred in generating the output signal thereof is still necessary, but such a datum need not be accurate in view of the fact that the significant imperfections in the datum are not "seen" by the detection system and thus will not form part of the eventual composite signal. Thus, for example, the separation of the transducer support from the surface under test may be effected by providing the support with one or more wheels, which in use of the apparatus, may roll over the surface of the component under test, or over a reference surface adjacent thereto. The circularity of the wheels, and the accuracy of their bearings is unimportant, as is the fact that the support as a whole, particularly if the wheels roll over the surface under test, will not provide a truly flat or truly circular reference datum.

In one embodiment of the invention there are first, second and third transducers mounted on the said common support, the transducers being arranged in a row and spaced from one another such that the distances between the first and second transducers is $l_1$ and the distance between the second and third transducers is $l_2$, the output signals from the three transducers being amplified, before combination thereof to provide said composite signal, by amplifiers having relative gains of $a$, $l$ and $b$ respectively where:

$$a + b - 2 = 0$$

and $$al_1 - bl_2 = 0.$$

With the separation of the transducers and the relative gains of the amplifiers in this form, and indicating the output signals from the first, second and third transducers as $p_1$, $p_2$ and $p_3$ respectively it is preferred that the composite signal formed from the output signals of the transducer has the form:

$$s = ap_2 + bp_3 - 2p_1. \quad (5)$$

Alternatively the three transducers may have sensitivities the relative values of which are $a$, $l$, $b$ respectively (the middle transducer having the sensitivity of $l$). Amplification factors are then the same for all three and the required relationship is $$p_1 + p_2 - 2p_3 = S.$$

It can be shown, in a composite signal of this form, that any DC term, due to differences in the separation between the reference datum and the surface, or any slope term introduced by any relative inclinations between the reference datum and the surface can be cancelled out.

To derive information concerning the texture of the surface under test, for example the roughness thereof, from the composite signal it is necessary to analyse this signal to derive the amplitude and phase of the various terms of the Fourier transform thereof. It can be shown that the relation between the Fourier transform of the composite signal $F_s$ to the Fourier transform of the true roughness signal $F_\lambda$ is given by:

$$F_S = F_\lambda \left( a\exp\left\{ \frac{+j2\pi l_1}{\lambda} \right\} + b\exp\left\{ \frac{-j2\pi l_2}{\lambda} \right\} - 2 \right) \quad (1)$$

from this it can be shown that the amplitude and phase of a harmonic of wavelength $\lambda$ on the surface is given by:

$$\text{Amplitude} = \left( a\cos\frac{2\pi l_1}{\lambda} + b\cos\frac{2\pi l_2}{\lambda} - 2 \right)^2 + \left( a\sin\frac{2\pi l_1}{\lambda} - B\sin\frac{2\pi l_2}{\lambda} \right)^{2\frac{1}{2}} \quad (2)$$

$$\text{Phase} = \frac{\tan^{-1} a\sin\frac{2\pi l_1}{\lambda} - b\sin\frac{2\pi l_2}{\lambda}}{a\cos\frac{2\pi l_1}{\lambda} + b\cos\frac{2\pi l_2}{\lambda} - 2} \quad (3)$$

To derive the Fourier components of the surface roughness signal, therefore, the composite signal from the sensor head is analysed and the coefficients of each harmonic are inversely weighted in accordance with the amplitude expression above, and phase shifted in a direction opposite and by an amount indicated by the expression for the phase of that harmonic given above. The modified coefficients of the harmonics are then synthesised from this to provide an output signal representing the Fourier transform of a signal representing the true form of the surface under test without errors due to the irregularities in the reference datum. Errors due to variations in the datum are removed since any variation in the datum position will affect all the transducers simultaneously.

The measurement of flatness or straightness of a surface does not rely upon the above mentioned Fourier analysis compensation and synthesis. The transducer combination acts as a means of detecting local slope changes on the surface.

The instantaneous output signal S is, in this case, given by $K\Delta m$ where $\Delta m$ is an estimate of the slope difference detected between the line joining the tips of the first and second probes and the line joining the tips of the second and third probes, and K is given by $$\frac{l_1 l_2}{l_1 + l_2}$$

or a similar constant determined by the configuration of the instrument, i.e. the method instrumentally of getting $\Delta m$.

The advantages of the use of such a device over existing techniques are that it can measure straightness and flatness independent of the datum, that it can give an output which is continuous or arbitrarily close to analogue unlike conventional methods which are limited to step by step measurements, that it is dynamic in nature and is therefore not subject to acceleration forces as are spirit level measurements whether of the liquid type or electronic, it can work at any angle without prior knowledge of the angle of measurement, and because of its potential for fast measurement thermal drift of the test piece is reduced. Typical speed reductions over existing methods are an order of magnitude or thereabouts.

The instantaneous output signal S is converted to true height of surface relative to the height at the start, assumed to be at $y = o$, $x = o$, and it is assumed that the support initial slope is a reference, i.e. from which other changes are measured, and is given by:

$$y(x) = x\frac{\epsilon_S}{K} \quad (4)$$

This is a different type of synthesis from that of equation (2) and (3). In order to ensure that texture is eliminated a low pass filter precluding wavelengths smaller than $(l_1 + l_2)$ is included. The underlying theory behind equation (4) is the mathematical concept that any continuous curve can be represented by a succession of piecewise polygons. The degree to which this is true depends only on the ratio of the polygon interval and the curve bandwidth.

If only the surface texture (roughness etc.) is of interest the longer wavelengths can be removed by filtering out signals having a wavelength greater than the separation between the two furthest transducers prior to analysis of the composite signals to derive the Fourier transform thereof. The reason that variations in the surface are detected by the sensor whereas variations in the datum are not is that variations in the surface affect the transducers sequentially, whereas variations in the datum affect transducers simultaneously. Thus, if the apparatus is to be used to determine surface texture it is preferred that a high pass filter is included therein. If, on the other hand, the apparatus is to be used for determining surface flatness, the high frequency components relating to the surface texture are of no interest and accordingly it is preferred that a low pass filter is included in the apparatus, or a blunt mechanical sensor used, which is insensitive to the short wavelength components of the surface texture.

For the measurement of texture on large diameter components four transducers may be used. In such an arrangement there may be provided first, second, third and fourth transducers spaced along a line and separated from a nominal mid point of the common support by distances $l_1$, $l_2$, $l_3$, $l_4$ respectively, the first and second transducers lying to one side of the said mid point and the third and fourth transducers lying to the other side of the mid point, the lines of action of the four transducers being parallel to one another and the output signals from the four transducers being amplified by four amplifiers having respective gains of $l$, $a$, $b$ and $c$ where:

$$l + a + b + c = 0$$

$$-l_1 - l_2 + bl_3 + cl_4 = 0$$

$$l_1^2 + al_2^2 + bl_3^2 + cl_4^2 = 0$$

before being combined to form the said composite signal. Such an arrangement is also useful for measuring surface texture on a part which is prone to bowing or buckling during measurement, for example, sheet steel. This four transducer arrangement can thus be used for removing instantaneous d.c., tilt and curvature components.

Alternatively, the lines of action of the plurality of transducers, when projected, may meet at a common point. This arrangement is suitable for use with any number of transducers from 2 upward on rigid curved components, that is components other than those prone to bowing or buckling during measurement.

In such an arrangement it is important that the transducers for practical usage project to the centre subtending an arc of less than 180°. Previous attempts to measure out-of-roundness, for example without reference to a true datum have suffered from one or other of two deficiencies: either the signal resulting therefrom has been severely distorted at certain frequencies, or the mechanical system has been inefficient because the total part has been enclosed by the transducer array. The latter disadvantage means that the measurement of roundness on the machine has to involve either taking the part out or having transducers to clip around it. In the present invention both effects are minimised or removed.

It is important to note that the angular separation of the transducers is of relevance rather than their metric or circumferential separation. In one embodiment there are provided first, second and third transducers arranged to follow a common path when traversed around a curved workpiece and the outputs of the three transducers are fed to respective amplifiers the gains of which are $a$, $l$ and $b$ respectively, prior to combination to form the said composite signal, the angular separation of the first and second transducers being $\alpha$ and the angular separation of the second and third transducers being $\beta$ where: $a \cos\alpha + b \cos\beta - l = 0$ and $b \sin\beta - a \sin\alpha = 0$. To extract the out-of-roundness information a Fourier analysis, compensation, and synthesis similar to the surface texture method is used.

Embodiments of the present invention can also be used to determine the radius of a circular surface of a component under test. In order to achieve this the composite signal produced by the combination of the plurality of amplified signals from the plurality of transducers is analysed to derive the Fourier transform thereof, the zeroth order component of the Fourier transform is then divided by a signal related to the relative sensitivities of the transducers or to the relative amplification factors by which the outputs therefrom are amplified prior to combination, to produce an output signal representing the difference between the radius of the component under test and a standard component in respect of which the average value of the zeroth order component of the Fourier transform over a full circle is a known value. Thus the method of determining the radius involves a setting up step using a reference body of known radius, in which the average value of the zeroth order component of the Fourier transform of the composite signal over a complete traverse is determined. The apparatus can be adjusted at this stage so that the average value of the zeroth order of the Fourier transform is zero: this simplifies the subsequent calculations but is not essential. The reference body is then removed, the component under test is put in its place and the apparatus set in motion to produce the output signal mentioned above.

The present invention also comprehends apparatus for performing this method. If the apparatus is set up so that the average value of the zeroth order component of the Fourier transform of the composite signal over a complete traverse is zero for a standard component of known radius, the zero or known constant setting can then be used as a reference with respect to which the radii of other components can be determined: this method is, of course, limited by the range of the transducers and the accuracy with which the original standard reference component can be set up and calibrated. Apparatus formed in accordance with the present invention is inherently more accurate than conventional methods, however, because it is substantially independent of the measuring system.

If, as is preferred, the surface measurement apparatus includes first, second and third transducers arranged in a row and spaced from one another by predetermined distances, and the said amplifying means comprise three amplifiers the relative gains of which are $a$, $l$ and $b$ respectively, the means for dividing the Fourier transform of the composite signal preferably operate to divide this by a signal related to the factor $(l-a-b)$. This can also be effected if the relative ratios of the sensitivities of the transducers are $a$, $l$ and $b$, (in which case the amplifiers would all have the same gain).

Various embodiments of the present invention will now be more particularly described, by way of example, with reference to the accompanying drawings, in which.

Figure 7:
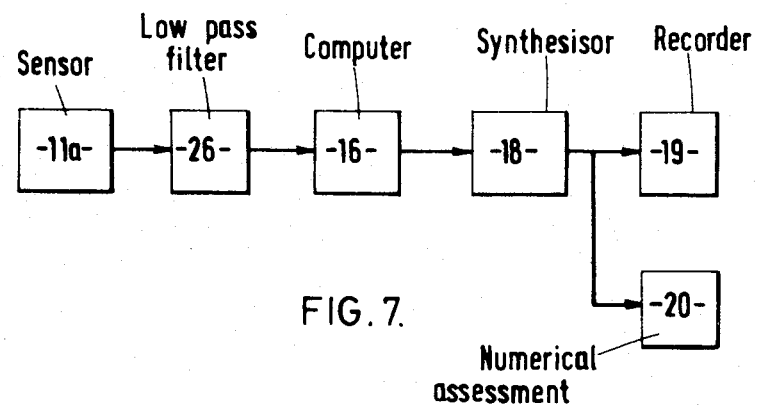
FIG. 7 is a block diagram illustrating an embodiment of the invention formed for the assessment of surface flatness.
Figure 8A:
Figure 8B:
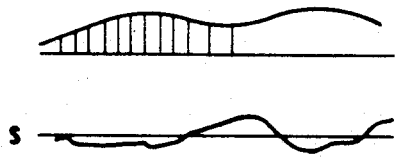
Figure 9:
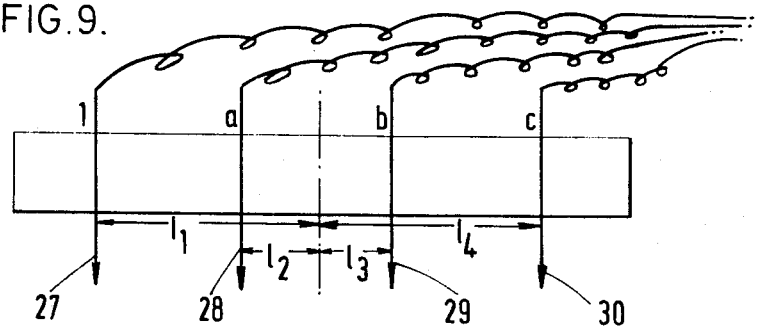
Figure 10:
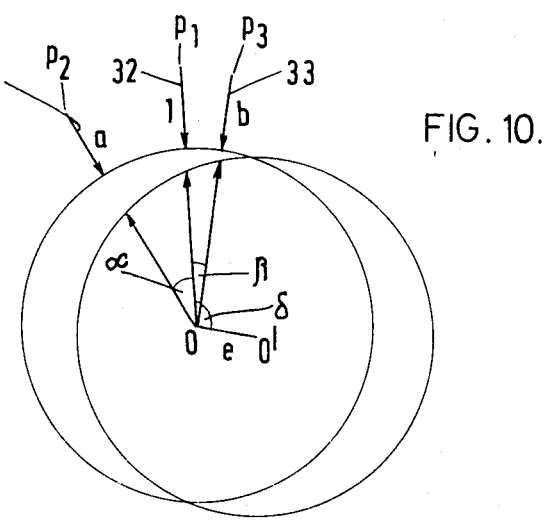
Figure 11:
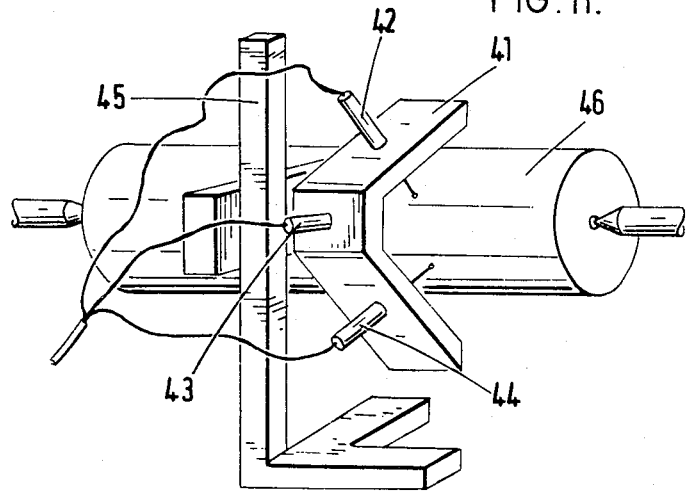
Figure 12:
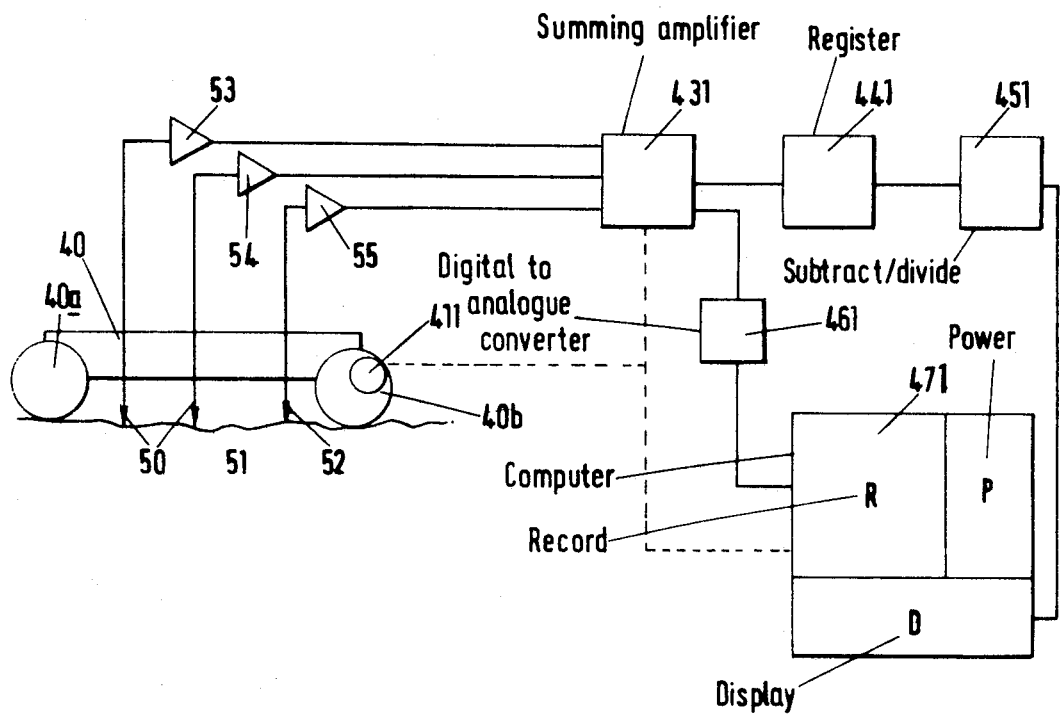
Figure 13:
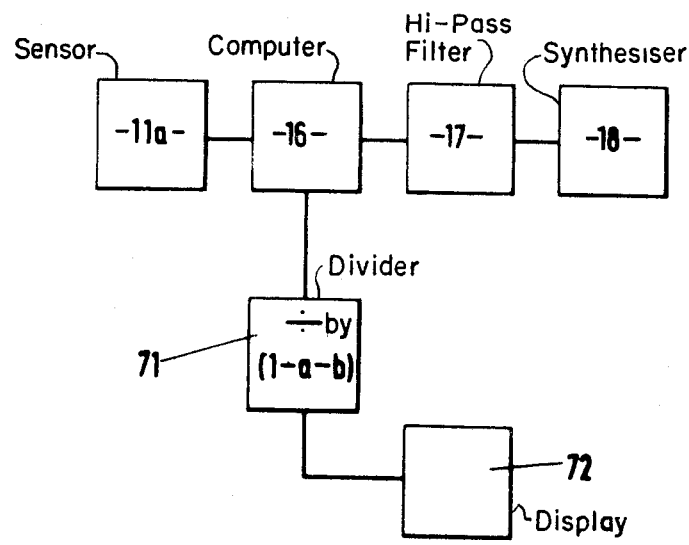

FIGS. 8(a) and 8(b) are diagrams illustrating the operation of the embodiment of FIG. 7;

FIG. 9 is a schematic diagram illustrating the formation of a sensor having four transducers the lines of action of which are parallel;

FIG. 10 is a diagram illustrating the conformation of a sensor having three transducers the lines of action of which meet at a common point;

FIG. 11 is a schematic diagram illustrating one form of practical embodiment of such a sensor head;

FIG. 12 is a schematic diagram illustrating an embodiment for straightness/flatness determination, and FIG. 13 is a block diagram of a part of an embodiment for determining the radius of curvature of the curved surface of a component under test.

Figure 1:
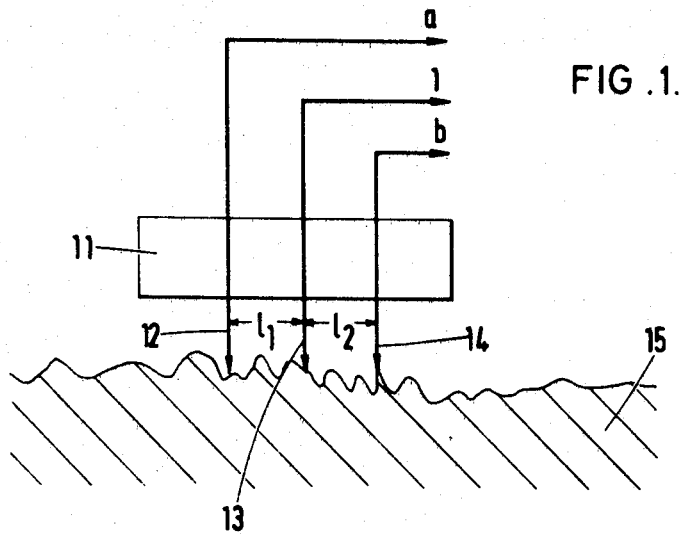
FIG. 1 is a schematic diagram illustrating the form of a sensor head including three transducers useful in explaining the operation of the invention.

Referring now to FIG. 1 there is shown a transducer mount generally indicated 11 on which are supported three transducers 12, 13, 14. The separation between transducers 12 and 13 is $l_1$ and separation between transducers 13 and 14 is $l_2$. The output signals from the transducers 12, 13, 14 are fed on respective lines to amplifiers (not shown) which have relative gains of $a$, $l$ and $b$ respectively, as indicated in FIG. 1. As outlined, if the signal from the transducers 12, 13, 14 is indicated $p_1$, $p_2$, $p_3$ respectively and the composite signal $s$ formed from the output signals of the three transducers has the form: $s = ap_2 + bp_3 - 2p_1$, then any term due to errors or inaccuracies in the reference datum which determines the separation of the support 11 from the workpiece surface 15 will be cancelled out if the separations $l_1$ and $l_2$, and the gains $a$ and $b$ are related by:

$$a + b - 2 = 0 \text{ and } al_1 - bl_2 = 0.$$

If it is desired to extract from the composite signal $s$ information on the roughness of the surface 15, it is necessary to analyse the composite signal $s$ to determine the components of the Fourier transform thereof.

It can be shown that the Fourier transform F$s$ of the signal $s$, relative to the Fourier transform F$_\lambda$ of a signal representing the true roughness of the surface is given by equation (1).

The amplitude and phase of a harmonic of wavelength of this relative Fourier transform is given by equations (2) and (3).

If the corresponding harmonics in the relative Fourier transforms F$s$ are weighted by factors opposite in sign to the amplitude and phase of the harmonics computed from the expressions given above, therefore, the synthesised coefficients will represent the components of the Fourier transform of a signal representing the true roughness of the surface.

Figure 2:
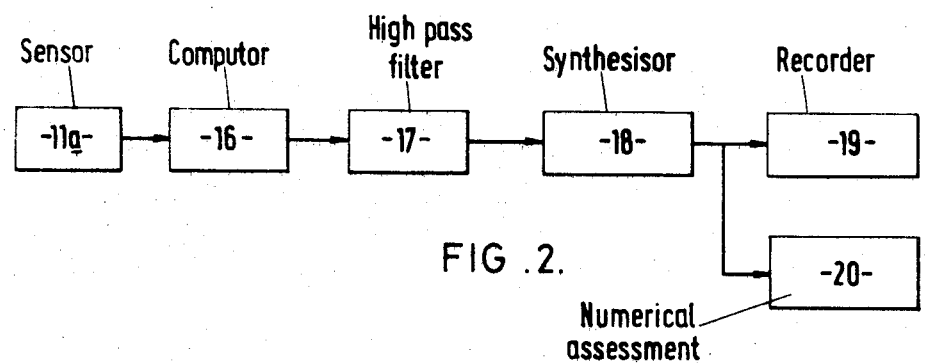
FIG. 2 is a block diagram illustrating an embodiment of the apparatus for producing an output representing the surface texture of a surface under test.

Apparatus for performing this method is illustrated in FIG. 2 in which the sensor 11 carrying the three probes 12, 13, 14 is shown as a block 11a, including the amplifiers and detectors which provide the relative gains $a$, $b$ and $l$ for output signals from the probes. The composite signal $s$ from the output of the sensor 11a is fed to a computer 16 which includes an analogue-to-digital converter and which computes the coefficients of the components of the Fourier transform of the composite signal. The output from the computer 16 is fed, via a high pass filter 17 which removes the low frequency components relating to surface flatness, etc., from the signal, to a synthesiser 18 which weights the coefficients of the harmonics of the Fourier transform of the composite signal inversely by amounts derived from the expressions for amplitude and phase of the relative Fourier transform of the composite signal with respect to a signal representing the true form of the surface under test. The output from the synthesiser thus represents the harmonics of the Fourier transform of a signal representing the form of the surface under test with no errors due to variations in the datum reference. The output from the synthesiser 18 is fed to a recorder 19 and a numerical assessment instrument 20, which may be incorporated in the computer 16 itself.

Figure 3:
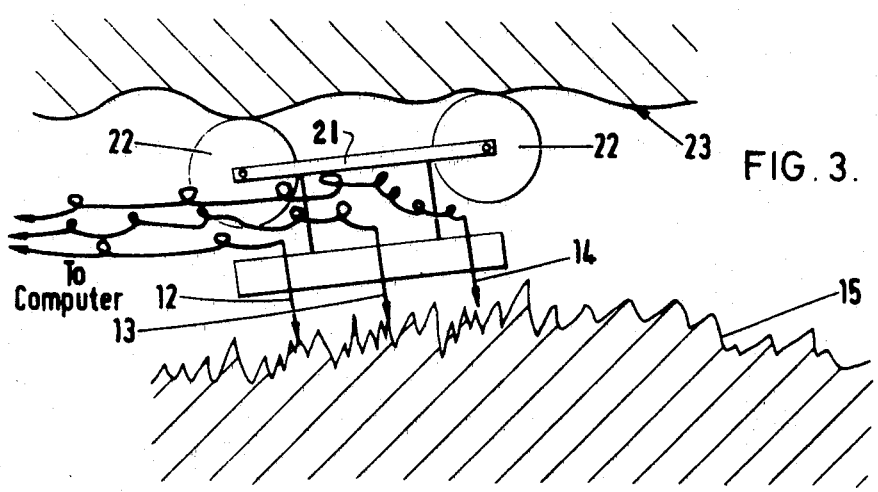
FIG. 3 is a schematic diagram illustrating one form of transducer mount.
Figure 4:
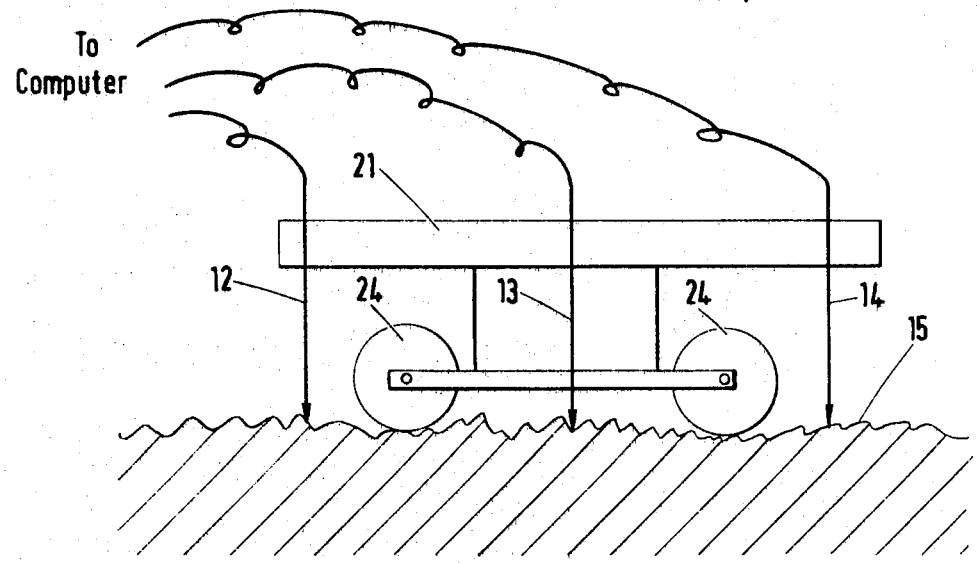
FIG. 4 is a schematic diagram illustrating a second form of transducer mount.

FIGS. 3 and 4 illustrate two forms of carriage which can be used to support the three transducers 12, 13 and 14 illustrated schematically in FIG. 1. In FIG. 3 the transducers 12, 13, 14 are mounted on a carriage 21 having two wheels 22 which are arranged such that the probes of the transducers 12, 13, 14 are directed away from the wheels so that the wheels can roll over a reference datum surface 23 placed alongside the test surface 15. In the embodiment of FIG. 4 the carriage is similarly provided with wheels 24, but these are arranged such that they can roll over the test surface 15 at the same time as the probes of the transducers 12, 13, 14 are in contact therewith. Errors that can be introduced will be of the form of tilt or dc, as shown by the above equations. Consequently, they will not be "seen" by the detector.

Figure 5:
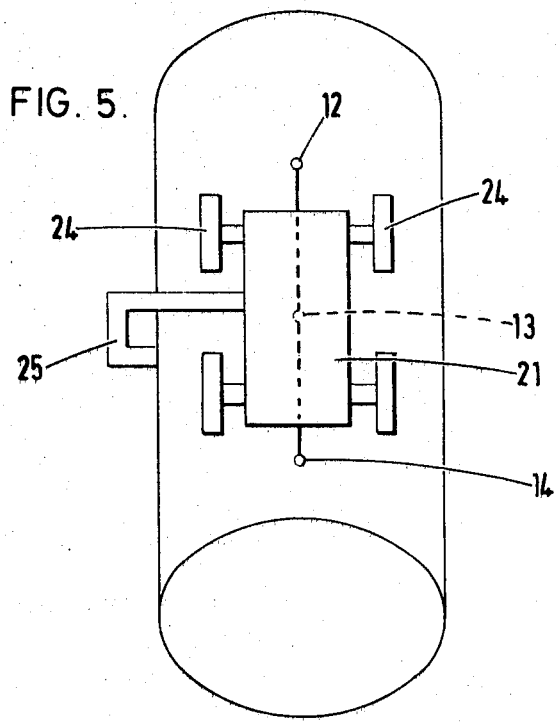
FIG. 5 is a schematic diagram illustrating the form of a transducer mount suitable for use in assessing cylindrical surfaces.

It is important to ensure, as far as is practically possible, that the three transducers 12, 13, 14 traverse the same path along the workpiece under test. In circumstances where it is possible to do so a guide 25 which is carried by the carriage 21 may be positioned to engage a rectilinear part, such as an edge, of the component under test. In FIG. 5 this arrangement is illustrated in a form suitable for testing the linearity of a cylindrical component, the guide 25 being arranged to contact the cylindrical component at a point spaced 90° around the circumference thereof from the contact line of the transducers 12, 13, 14.

Figure 6:
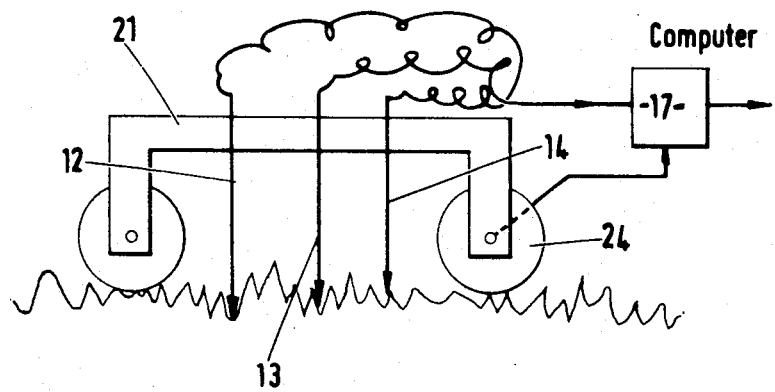
FIG. 6 is a schematic diagram illustrating a further embodiment of the invention.

Embodiments of the present invention do not require that the traversing speed of the transducers is constant, providing a suitable reference of the instantaneous speed is provided. In the embodiment of FIG. 6, there is shown an arrangement in which the carriage 21 has a device sensitive to the rotation of one of the wheels 24 to provide pulses representing the movement of the carriage, these pulses being fed to the computer 17 to initiate sampling, and to the recorder if accurate synchronism of the graph with the part is needed. Alternatively, a towing wire (digiwire) which provides pulses in equal length could be used.

An embodiment of the invention arranged for the measurement of straightness or flatness is illustrated in FIG. 7. This is similar to the embodiment of FIG. 2, in comprising a sensor 11a, a computer 16, a synthesiser 18, a recorder 19 and a numerical display 20, but in addition there is provided a low pass filter 26 between the sensor 11a and the computer 16, which filter removes the high frequency components of the composite signal which carry the information concerning the surface texture. The filter 26 should be as close to the transducers as possible and could conveniently be in the form of blunt feet to the transducers. An additional filter could also be used.

FIG. 8a illustrates in schematic form, an idealised flat edge and the output, and FIG. 8b illustrates a more typical signal. The DC value of the signal at any position can be found by interrogation of the pattern in the signal $s$. The base length for interrogation is preferably greater than $l_1 + l_2$.

The carriage 21 on which the transducers 12, 13, 14 are mounted may be traversed along the required path on the surface under test by a suitable instrument, or may be hand held, the computer and other calculating parts of the equipment being at a remote location.

Instead of the instantaneous value of $s$ an integrated value taken over a length $l_1 + l_2$ may be used to improve the signal-to-noise ratio and reduce effects of texture. As before, a pulse link from the wheels 24 may be passed to the recorder and computer to ensure synchronisation. In a preferred form the wheels 24 would be about the same spacing as $l_1 + l_2$ for stability.

In another embodiment (FIG. 12) the computer not only computes the values of $y$ from the signal values S, it also works out the least squares line or plane from the data. The value is obtained from the following formula being computed in a running manner as the traverse is taken (when N is the number of measurements).

$$m = \frac{N \Sigma xy - \Sigma x \Sigma y}{N \Sigma x^2 - (\Sigma x)^2}$$

Also the intercept $c = \bar{y} - (m\bar{x}/2)$ is calculated where $\bar{x}$ is the length of traverse and $\bar{y}$ the average value of $y$; $m$ and $c$ may be displayed for subsequent drawing on the graph.

The computer may be of analogue or digital type. In FIG. 12 there is shown a common carriage 40 on which are supported three transducers 50, 51, 52 and which has two wheels 40a, 40b for rolling over a surface to be assessed. The carriage 40 may alternatively have three or four wheels. The output signals from the transducers 50, 51, 52 are amplified in respective amplifiers 53, 54, 55 having appropriate gains and the three amplified signals are fed to a summing amplifier 431 incorporating filter circuits, divider circuits, multiplier circuits and integrator circuits. The output from the summing amplifier 431 goes to a group of register circuits indicated 441 which store signals representing $\Sigma x$, $\Sigma y$, and $\Sigma xy$ and $\Sigma x^2$. A subtractor/divider circuit 45 feeds appropriate signals from the register to a computer generally indicated 471. The computer 471 is also fed with a synchronising signal from an encoder 411 on the wheel 40b of the common carriage 40, which synchronising signal is also fed to the summing amplifier 431. Alternatively, a towing link may be used. An output from the summing amplifier 431 is also fed to the computer 471 via a D/A circuit 461. The computer 471 includes a power supply P, a recorder R and a digital display D of the best fit slope and intercept values calculated by the circuits.

Another application of the surface measurement apparatus of the invention is in the removal of the effects of extraneous vibration from equipment having a long mechanical loop between the sensor, its support and the specimen being measured. An example of particular interest is in the measurement of small step heights of the order of 1 microinch or less. The use of a system hving two transducers can reduce the effects of vibration providing that the transducer mount containing the two transducers is only a small element in the mechanical loop of the system.

In the embodiment of FIG. 9 there is illustrated an arrangement in which four transducers are carried on a common support with their lines of action parallel to one another. The transducers are indicated 27, 28, 29 and 30 and the output signals therefrom are indicated $p_1$, $p_2$, $p_3$ and $p_4$ respectively. The sensor includes amplifiers (not shown) linked to the transducers 27, 28, 29 and 30 and having amplification factors $l$, $a$, $b$ and $c$. The transducers 27, 28, 29 and 30 are spaced from a nominal mid position by distances $l_1$, $l_2$, $l_3$ and $l_4$ respectively, transducers 27 and 28 lying to the left of this mid-point and transducers 29 and 30 lying to the right of this mid-point. (Any arrangement is allowed using Lagrangianunequal spacing theorems.)

In this arrangement the composite signal produced by the probe is in the form:

$$s = p_1 + ap_2 + bp_3 + cp_4$$

where, $a$, $b$, $c$, $l_1$, $l_2$, $l_3$ and $l_4$ are arranged such that $$l + a + b + c = 0$$

$$\left. \begin{array}{l} -l_1 - al_2 + bl_3 + cl_4 = 0 \\ l_1^2 + al_2^2 + bl_3^2 + cl_4^2 = 0 \end{array} \right\} \quad (5)$$

From this it will be seen that the relative gains $a$, $b$, $c$ are given by:

$$\left. \begin{array}{l} a = -(l + b + c) \\ b = \dfrac{(l_1 - l_2)(l_4 + l_1)}{(l_2 + l_3)(l_4 - l_3)} \\ \text{and} \quad c = \dfrac{(l_2 - l_1)(l_3 + l_1)}{(l_4 + l_2)(l_4 - l_3)} \end{array} \right\} \quad (6)$$

The analysis of the composite signal from the four transducers and subsequent synthesis of the appropriate components of the Fourier transform to effect the desired weighting is then performed as described in relation to the earlier embodiments.

The particular transducers used as transducers 12, 13, 14 or 27, 28, 29, 30 may be of any known type. They may be axial side acting, piezo-electric or inductive, or may even be of a non-contacting type.

Referring now to FIG. 10 there is shown a schematic diagram illustrating the arrangement of three transducers 31, 32, 33 in such a way that their lines of action meet at a common point 0 spaced by a distance $e$ from the centre 0' of a component. The signals from the transducers 31, 32, 33 are indicated $p_2$, $p_1$, $p_3$ respectively and, as before, the gains of the transducers are $a$, $l$ and $b$. The angular separation of transducers 31 and 32 is $\alpha$ and the angular separation of the transducers 32 and 33 is $\beta$.

It can be shown that, to a first order, the values of the angles $\alpha$ and $\beta$ required for the composite signal to include no components due to a shift of the body, rather than the surface variations of the body, the composite signal $s$ should be of the form:

$$s = e(-\cos\delta + a\cos(\delta + \alpha) + b\cos(\delta - \beta)) \quad (7)$$

where $\delta$ is the inclination between the line of action of the middle transducer 32 and a line joining the points 0 and 0'.

From this it can be shown that the angles $\alpha$ and $\beta$ are given by:

$$\left. \begin{array}{l} \alpha = \cos^{-1}\dfrac{1}{2}a(l - b^2 + a^2) \\ \beta = \cos^{-1}\dfrac{1}{2}b(l - a^2 + b^2) \\ \alpha + \beta = \cos^{-1}\dfrac{1}{2}ab(l - (a^2 + b^2)) \end{array} \right\} \quad (8)$$

The eccentricity of the movement of the sensor, with respect to the centre of the circular surface over which the sensor moves is thus eliminated from the sensor signal s by the suitable positioning of the transducers and suitable modification of their gains. A consequence of removing the eccentricity by this spatial configuration, however, is that no matter how the part centre moves during one revolution it will not be detected to a first order. It does not matter whether the part centre path is systematic or not, neither does it matter if the path of the centre when analysed, contains many harmonics none of them will be seen because they do not get past the spatial filter provided by the particular configuration of probe angles and the particular values of their gains.

One example of a solution for the expressions for $\alpha$ and $\beta$ is $\alpha = 53°$, $\beta = 37°$, $a = 0.6$ and $b = 0.8$.

Finally, referring to FIG. 11 there is shown a sensor 41 carrying three transducers 42, 43, 44 the lines of actions of which meet at a common point. The sensor 41 is carried on an upright support 45 so that the three transducers 42, 43 and 44 can be applied to the curved surface of a cylindrical component 46. The support 45 holds the sensor 41 stationary while the component 46 is rotated with respect thereto. As shown in FIG. 11 the transducers 42, 43, 44 are of the axial displacement type, although it will be appreciated that side acting transducers could be utilised in place of these, and, in fact, would be advantageous in some respect in that cross axial effects are eliminated.

Although in the embodiments described above either texture or flatness/roundness have been determined independently, embodiments could be provided in which, for example, both texture and flatness or straightness might be obtained at the same time using the same sensor, in which case the filtering would be isolated from the computing to enable both processes to be conducted without interfering with each other.

FIG. 13 illustrates a part of an embodiment having circuits for determining the radius of curvature of the curved surface of a component under test. In FIG. 13 the reference numerals correspond to those of FIG. 2 where corresponding elements are indicated. Thus the block 11a represents a sensor head carrying three transducers each having an associated amplifier which provides the appropriate relative gains $a$, $l$ and $b$ for the output signals from the transducers which are separated by predetermined distances. The block 11a also includes means for combining the three amplified signals to form a composite signal of the form $S = P2 + P3 - P1$, where $P1$, $P2$ and $P3$ are respectively the output signals from the first, second and third transducers. The composite signal is then sent to a computer 16 which includes an analogue-digital converter and which operates to compute the co-efficients of the component of the Fourier transform of the composite signal. The output from the computer 16 is fed, as described above in relation to FIG. 2, to a high pass filter 17 and from there to a synthesiser 18 which weights the co-efficients of the harmonics of the Fourier transform of the composite signal in a manner as described in relation to FIG. 2. The computer 16, in this embodiment, is connected to feed out the zeroth order component of the Fourier transform to a divider 71 preset to divide the input signal fed thereto by the factor $(l-a-b)$ where $a$ and $b$ are the relative gains of the first and third transducer in the row. The output from the divider is fed to a display device 72 suitably calibrated to display the radius represented by the signals at the output of the divider 71.

I claim:

1. In a surface measurement apparatus of the type wherein a sensor is traversed along a path in sensing relation with the surface of a component under test and operates to produce sensor output signals representing the surface under test, the improvement wherein:

said sensor comprises first, second and third transducers, each said transducer being individually and equally sensitive to surface variations and operating to produce an output signal $P_1$, $P_2$, $P_3$ respectively, common support means mounting said first, second and third transducers spaced from one another by respective predetermined distances, and in relative positions such that each transducer traverses substantially the same path over the surface of the component upon relative movement of said common support and the component under test, the spacing of said common support from the surface of the component under test providing a reference datum for the transducers in generating the output signals thereof, amplifier means for amplifying the said output signals $P_1$, $P_2$, $P_3$ from said first, second and third transducers respectively such that said output signals are related by relative factors of $a$, $l$ and $b$ respectively, and means for combining the output signals from the transducers to produce a composite signal S of the form $S = aP_2 + bP_3 - 2P_1$ which includes no component due to significant imperfections in the reference datum.

2. The surface measurement apparatus of claim 1, wherein there is further provided an analysing computer for analysing said composite signal to derive therefrom a signal representing the Fourier transform of said composite signals, said computer also computing the amplitude and phase of the components of the relative Fourier transform of the composite signal with reference to the Fourier transform of the roughness signal derived from any one of the said first, second or third transducers, and a synthesiser for weighting the amplitude and phase of each component of said Fourier transform of the composite signal inversely by an amount dependent on the computed value of the amplitude and phase respectively of the corresponding term of the relative Fourier transform, whereby to synthesise signals representing components of the Fourier transform of a signal representing the surface under test.

3. The surface measurement apparatus of claim 2, wherein there is further provided a high pass filter between said analysing computer and said synthesiser whereby to adapt said apparatus for the measurement of surface texture of the component under test.

4. The surface measurement apparatus of claim 1, wherein said common support for said plurality of transducers of said sensor is provided with at least one wheel which, in use of the apparatus, rolls over the surface of said component under test whereby to space said common support from the surface of the component under test to form said reference datum.

5. The surface measurement apparatus of claim 4, wherein said common support is also provided with a lateral guide engageable on said component under test for ensuring that the transducers all follow substantially the same path over the surface of the component under test.

6. The surface measurement apparatus of claim 4, wherein said at least one wheel of said common support is provided with means sensitive to the rotation thereof to provide an output signal containing information concerning the position of said common support with respect to said surface of said component.

7. The surface measurement apparatus of claim 1, wherein said common support for said plurality of transducers of said sensor is provided with at least one wheel,
   a reference surface adjacent the surface of said component under test, said at least one wheel of said sensor, in use of the apparatus, rolling over said reference surface adjacent said component under test whereby to space said common support from the surface of the component under test to form said reference datum.

8. The surface measurement apparatus of claim 7, wherein said common support is also provided with a lateral guide engageable on said component under test for ensuring that the transducers all follow substantially the same path over the surface of the component under test.

9. The surface measurement apparatus of claim 1, wherein there is further provided an analysing computer for analysing instantaneous changes in slope of said composite signal and for converting these into an analysed signal representing the profile of the surface under test.

10. The surface measurement apparatus of claim 9, wherein there is further provided a low pass filter in advance on said computer.

11. The surface measurement apparatus of claim 9, wherein said computer includes means for deriving from said analysed signal, a signal representing a best fit line with respect to said analysed signal.

12. The surface measurement apparatus of claim 1, adapted for circular components, in which the lines of action of said first, second and third transducers, when projected, meet at a common point.

13. The surface measurement apparatus of claim 12, wherein the angular separation of said first and second transducers is $\alpha$ and the angular separation of said second and third transducers is $\beta$ where:

$$a \cos \alpha + b \cos \beta - 1 = 0$$

and $$b \sin \beta - a \sin \alpha = 0.$$

14. The surface measurement apparatus of claim 1 wherein said first, second and third transducers have substantially equal sensitivity and amplifier means introduces said factors $l$, $a$ and $b$ by amplifying said output signals $P_1$, $P_2$, $P_3$ by respective gains related by said factors $a$, $l$ and $b$.

15. The surface measurement apparatus of claim 1, wherein said first, second and third transducers have relative sensitivities of $a$, $l$ and $b$ respectively, and said amplifier means operate to amplify said output signals $P_1$, $P_2$ and $P_3$ substantially equally.

16. The surface measurement apparatus of claim 1, wherein said first, second and third transducers mounted on said common support are arranged in a row, and spaced from one another such that the distance between said first and second transducers is $l_1$ and the distance between said second and third transducers is $l_2$, and
   said relative factors $a$, $l$ and $b$ relating said output signals from said three transducers are such that:

$$a + b - 2 = 0$$

and $$al_1 - bl_2 = 0.$$

17. The surface measurement apparatus of claim 16, wherein said transducers are spaced along an arcuate row and directed so as to sense the surface of a body having a nominally circular cross section, and there are provided means for deriving the Fourier transform of said composite signal,
   means for determining the average value of the zeroth order component of the Fourier transform of a composite signal derived from a complete circumferential traverse of a reference body of known radius, and
   means for dividing the zeroth order component of the Fourier transform of said composite signal by a signal related, to a factor, to $(l\text{-}a\text{-}b)$, whereby to produce an output signal representing the difference in radius between the component under test and said reference body of known radius.

18. In a surface measurement apparatus of the type wherein a sensor is traversed along a path in sensing relation with the surface of a component under test and operates to produce sensor output signals representing the surface under test,
   the improvement wherein:
   said sensor comprises first, second, third and fourth transducers,
   each said transducer being individually sensitive to surface variations and operating to produce an output signal $P_1$, $P_2$, $P_3$, $P_4$ respectively,
   common support means mounting said first, second, third and fourth transducers spaced from one another by respective predetermined distances, and in relative positions such that each transducer traverses substantially the same path over the surface of the component upon relative movement of said common support and the component under test, the spacing of said common support from a fixed surface providing a reference datum for the transducers in generating the output signals thereof,
   amplifier means for amplifying said output signals $P_1$, $P_2$, $P_3$ and $P_4$ from said first, second, third and fourth transducers in such a way that, after amplification, said output signals are related by factors $l$, $a$, $b$, and $c$ respectively where $l+a+b+c=0$, and
   means for combining the output signals from the transducers to produce a composite signal S of the form $S = P_1 + aP_2 + bP_3 + cP_4$ which includes no component due to significant imperfections in the reference datum.

19. The surface measurement apparatus of claim 18, wherein said first, second, third and fourth transducers are spaced along a line and separated from a nominal mid-point of said common support by distanaces $l_1$, $l_2$, $l_3$ and $l_4$ respectively, said first and second transducers lying to one side of said mid-point and said third and fourth transducers lying to the other side of said mid-point, the lines of action of said four transducers being substantially parallel to one another, said distances $l_1$, $l_2$, $l_3$, $l_4$ being related to one another such that $$-l_1 - al_2 + bl_3 + cl_4 = 0$$

$$l_1^2 + al_2^2 + bl_3^2 + cl_4^2 = 0.$$

20. The surface measurement apparatus of claim 18, wherein said first, second, third and fourth transducers have substantially equal sensitivities and said amplifier means introduces said factors $l$, $a$, $b$ and $c$ by amplifying said output signals $P_1$, $P_2$, $P_3$ and $P_4$ by respective gains related to said factors $l$, $a$, $b$ and $c$.

21. The surface measurement apparatus of claim 18, wherein said first, second, third and fourth transducers have relative sensitivities of $l$, $a$, $b$, and $c$ respectively, and said amplifier means operate to amplify said output signals $P_1$, $P_2$, $P_3$ and $P_4$ substantially equally.

22. The surface measurement apparatus of claim 18, wherein said common support for said plurality of transducers of said sensor is provided with at least one wheel which, in use of the apparatus, rolls over the surface of said component under test whereby to space said common support from the surface of the component under test to form said reference datum.

23. The surface measurement apparatus of claim 22, wherein said common support is also provided with a lateral guide engageable on said component under test for ensuring that the transducers all follow substantially the same path over the surface of the component under test.

24. The surface measurement apparatus of claim 22, wherein said at least one wheel of said common support is provided with means sensitive to the rotation thereof to provide an output signal containing information concerning the position of said common support with respect to said surface of said component.

25. The surface measurement apparatus of claim 22, wherein there is further provided a towing wire system for providing an output signal representing the position of said transducers along the surface under test.

26. The surface measurement apparatus of claim 18, wherein said common support for said plurality of transducers of said sensor is provided with at least one wheel,
a reference surface adjacent the surface of said component under test, said at least one wheel of said sensor, in use of the apparatus, rolling over said reference surface adjacent said component under test whereby to space said common support from the surface of the component under test to form said reference datum.

27. The surface measurement apparatus of claim 26, wherein said common support is also provided with a lateral guide engageable on said component under test for ensuring that the transducers all follow substantially the same path over the surface of the component under test.

28. The surface measurement apparatus of claim 18, wherein there is further provided an analysing computer for analysing instantaneous changes in slope of said composite signal and for converting these into an analysed signal representing the profile of the surface under test.

29. The surface measurement apparatus of claim 28, wherein there is further provided a low pass filter in advance on said computer.

30. The surface measurement apparatus of claim 28, wherein said computer includes low pass filtering means.

31. The surface measurement apparatus of claim 28, wherein said computer includes means for deriving from said analysed signal, a signal representing a best fit line with respect to said analysed signal.

* * * * *